US012559309B2

(12) United States Patent (10) Patent No.: US 12,559,309 B2
Hermsen et al. (45) Date of Patent: Feb. 24, 2026

(54) WAREHOUSE FOR THE STORAGE AND RETRIEVAL OF GOODS OR BUNDLES OF GOODS PLACED ON LOAD CARRIERS

(71) Applicant: NEDCON B.V., Doetinchem (NL)

(72) Inventors: Jeroen Hermsen, Zutphen (NL); Erwin Straatsma, Wehl (NL)

(73) Assignee: NEDCON B.V., Doetinchem (NL)

( * ) Notice: Subject to any disclaimer, the term of this patent is extended or adjusted under 35 U.S.C. 154(b) by 557 days.

(21) Appl. No.: 18/012,335

(22) PCT Filed: Jun. 30, 2021

(86) PCT No.: PCT/EP2021/068048

§ 371 (c)(1),
(2) Date: Dec. 22, 2022

(87) PCT Pub. No.: WO2022/003048

PCT Pub. Date: Jan. 6, 2022

(65) Prior Publication Data

US 2023/0303322 A1 Sep. 28, 2023

(30) Foreign Application Priority Data

Jul. 2, 2020 (DE) ..................... 10 2020 117 495.0

(51) Int. Cl.
*B65G 1/04* (2006.01)
(52) U.S. Cl.
CPC ......... *B65G 1/0414* (2013.01); *B65G 1/0492* (2013.01)
(58) Field of Classification Search
CPC .... B65G 1/0414; B65G 1/0492; B61B 13/00; E01B 5/02; E01B 7/28; E01B 25/00

USPC ....... 104/130.01, 130.07; 238/134, 135, 175, 238/176; 246/375, 465
See application file for complete search history.

(56) References Cited

U.S. PATENT DOCUMENTS

| | | | | |
|---|---|---|---|---|
| 1,932,501 A | * | 10/1933 | Allman | .................... H02G 5/04 |
| | | | | 238/175 |
| 2,469,575 A | * | 5/1949 | Ralston et al. | ........ B65G 35/06 |
| | | | | 104/130.07 |
| 2018/0127207 A1 | | 5/2018 | Neu et al. | |

(Continued)

FOREIGN PATENT DOCUMENTS

| | | |
|---|---|---|
| AT | 511623 A2 | 1/2013 |
| DE | 202011102596 U1 | 11/2011 |

(Continued)

*Primary Examiner* — S. Joseph Morano
(74) *Attorney, Agent, or Firm* — Smartpat PLC

(57) ABSTRACT

A warehouse for the storage and retrieval, by a distribution vehicle, of goods placed on load carriers, includes aisles which are located in a frame and along which the distribution vehicle is able to travel. It further includes storage locations in the frame for the load carriers. The aisles comprise guideways which are fastened to the frame and which each have a rail along which the distribution vehicle is able to travel, as well as side walls along the rail. In order to reduce vibrations in the region of the fastenings of successive guideways and crossings the guideways are each fastened, at their mutually facing ends, by means of at least one connecting element to a horizontal support surface fixed to the frame. The connecting element is located laterally outside the rail and laterally outside the plane in which each side wall extends.

22 Claims, 6 Drawing Sheets

(56)          References Cited

U.S. PATENT DOCUMENTS

2020/0343118 A1    10/2020  Torazawa et al.
2024/0140706 A1 *   5/2024  Rempel et al. ...... B65G 1/0492

FOREIGN PATENT DOCUMENTS

DE      102010029563  A1    12/2011
DE      102014114496  A1     4/2016
DE      102014114978  A1     4/2016
EP         3321216  A1     5/2018
GB         2096559  A  * 10/1982    ............ B66B 23/14
GB         2573616  A     11/2019
WO        2019087618  A1     5/2019
WO        2020074257  A1 *  4/2020    ........... B65G 1/0492
WO        2022248333  A1 * 12/2022    ........... B65G 1/0492

* cited by examiner

WAREHOUSE FOR THE STORAGE AND RETRIEVAL OF GOODS OR BUNDLES OF GOODS PLACED ON LOAD CARRIERS

TECHNICAL FIELD

The disclosure relates to a warehouse for the storage and retrieval of goods or bundles of goods which are arranged on load carriers by means of a distributor vehicle.

BACKGROUND

Warehouses with distributor vehicles for the storage and retrieval of goods or bundles of goods which are arranged on load carriers are also referred to as "shuttle warehouses." The basic structure of the warehouse forms a framework which is constructed from a large number of vertical and horizontal framework elements and in which the storage units, for example, relatively large goods or pallets loaded with goods are stored at individual storage locations which are located at both sides of transport passages. For the storage, retrieval or also relocation of the goods within the warehouse there is used a distributor vehicle which can be driven in the passages and which is often referred to as a "shuttle" or "satellite vehicle". This vehicle is constructed to move under the load carriers which are loaded with the goods, subsequently to lift them and then to transport them to other positions within the warehouse. Such distributor vehicles functional autonomously and in a program-controlled manner and have means to lift the respective load carriers in a fully automated manner, pull them from the laterally arranged storage positions into the passage and then to move within and along the transport passages.

In the transport passages, the distributor vehicle moves on rollers which run in guides which are mounted so as to be secured to a frame, wherein the guides comprise a running rail whose horizontal upper side forms the running face for the roller, and side walls. In order to enable the distributor vehicle to change between individual transport passages in relatively large warehouses, a connection passage may in addition be provided transversely relative to the transport passages. Intersection regions of the connection passage with the transport passages are thereby produced. Since the distributor vehicle travels with the rollers thereof along a left and a right guide, a total of four intersections on which the guides extend toward each other in a cross-like manner are produced in each intersection region.

The intersections lead to the guides being highly segmented in these regions, that is to say, they are composed of shorter or longer successive rail segments in the longitudinal direction. In this case, the ends of the rail segments facing each other are positioned on a common horizontal support face, for example, on a console which is secured to the frame, and are vertically screwed thereto. The connection elements which are in the form of screws, even when the upper sides of the screws are arranged in a state recessed with respect to the running faces, lead to a slight vibration when the distributor vehicle travels over them. A noise emission is linked with this.

In order to reduce such a noise emission, EP 3 321 216 A1 proposes the use of press-in threaded bolts as connection elements in place of the otherwise conventional countersunk-head screws. The press-in threaded bolts are configured in such a manner that the upper side thereof terminates flush with the running face of the running rail and a smooth running of the distributor vehicle with little noise emission is thus achieved. However, the use of the press-in bolts which are configured accordingly leads, to higher component costs in comparison with conventional screw connections.

Similarly, in order to reduce the noise emission in the region of the butt joints between sequential guides, DE 10 2010 029 563 B4 proposes that not all butt joints be arranged at the same height when viewed in the running direction, but instead they are arranged offset with respect to each other. The distributor vehicle during its movement along the rail segments does not travel over the impact regions present at both sides at the same time. For the securing of the guides or rail segments, screws having a substantially horizontal screw axis are used so that the screws are located outside the running faces of the guides.

In the warehouse according to DE 10 2014 114 496 A1, rail segments when viewed in the longitudinal rail direction have at the left and right beside the rail joint a first receiving member for a bolt-like securing means which extends perpendicularly to the longitudinal rail direction. A securing clamp is further provided. This clamp has two U-shaped recesses for receiving the securing means, wherein the U-shaped recesses are formed in an angled manner on the respective outer leg.

Another securing technique for successive rail segments is known from DE 10 2014 114 978 A1.

SUMMARY

An object of the disclosure is, in a warehouse, in particular when in the form of a shuttle warehouse, using the advantage of low component costs to reduce such noises and vibrations in the region of the fastenings of successive guides and preferably also in the region of crossings, which would otherwise occur when the distributor vehicle ("shuttle") travels over them.

In order to achieve this objective, a warehouse having the features as claimed is proposed. The warehouse may provide intersection regions over which the distributor vehicle can travel.

As a result of these configurations, in the region of the connection elements which are, for example, in the form of screw connections, impacts and vibrations which are brought about by the connection elements when the distributor vehicle travels over them are prevented. This is because this would be linked with an increased noise emission and would in the long term lead to increased loading and in the longer term to wear of the structural elements and components involved, including on the distributor vehicle.

This advantage is particularly evident in the region of the intersection between two passages along which the distributor vehicle can be selectively driven. The region of the intersection is travelled over in the context of operational procedure particularly often by the wheels or rollers of the distributor vehicle, for which reason the permanent loading is also particularly high in this region.

Preferably, not only one of the guides which meet at the intersection, but instead all the guides which meet at that location are secured in each case at the end thereof facing the intersection by means of at least one connection element, for example, a screw, which extends vertically, to the support face which is secured to the frame. This support face is preferably the planar upper side of a plate which is configured in a stable manner. It is also decisive in this instance that each connection element is arranged laterally outside the running rail and laterally outside the plane in which the respective side wall extends so that when the distributor vehicle travels past there are no vibrations originating from the connection element.

Where this is possible for reasons of space, the securing of the mutually facing ends of the respective guides should be carried out with two connection elements in each case, that is to say, a first connection element at the one side and a second connection element at the other side of the relevant guide. It is also significant in this instance that each of the two connection elements is arranged laterally outside the running rail and laterally outside the plane in which the respective side wall extends so that no vibrations originate from the connection elements when the distributor vehicle travels past.

In order to receive the connection elements, the guides are provided at the ends thereof with flaps which protrude laterally from the running rail. The respective connection element, that is to say, for example, a screw, leads in this instance vertically through an opening or recess which was produced in the flap, for example, by means of punching.

For the smallest possible deformation of the guides, even under load, it is proposed that the flaps be positioned with their flat lower side on the horizontal support face which is secured to the frame. From a technical production viewpoint, it is advantageous for the flat upper side of the flaps to be flush with the running face of the respective running rail.

For an optimum configuration of the guide in technical production terms, it is further proposed that the side walls be omitted on the longitudinal portion of the guide on which the flaps are formed. Conversely, the flaps which protrude toward the side from the running face are omitted on the longitudinal portion of the guide on which the side walls are formed. This configuration complies with the precondition of producing the guide in a cost-effective manner from an initially flat piece of steel sheet which is processed by means of punching. As a result of a bending process which is simple to carry out, a first longitudinal portion of the edge of this steel sheet forms the respective side wall, whilst a shorter, second longitudinal portion of the edge is not subjected to any deformation and this shorter longitudinal portion forms the flap through which the connection element extends in the assembly state.

With regard to the central region of the intersection, with another embodiment it is proposed that exclusively in one of the guides the end of the running rail is expanded to form a primarily circular plate whose circle center forms the center of the intersection.

Preferably, the circular plate has at the circumference thereof three part-circular edge portions opposite which edges which are configured in a circular-concave manner and which are opposite the ends of the running rails of the three remaining guides are arranged.

In order to reinforce the corner regions of the intersection, it is proposed that in the corner region of two guides which meet each other in the region of the intersection there is arranged an additional corner element having two wall portions which are arranged at an angle relative to each other. In this instance, the first wall portion adjoins the side wall of one of the two guides and the second wall portion adjoins the side wall of the other of the two guides. Preferably, the wall portions which adjoin each other in such a manner are arranged at right-angles with respect to each other, wherein the corner element between these two wall portions has at least two additional wall portions whose wall faces facing the intersection are located at an angle between 210° and 260° with respect to each other.

Since the corner element is a component of the necessary lateral guide of the distributor vehicle and is accordingly subjected to high lateral loads and occasionally also impacts, the corner element should be secured to the horizontal support face which is secured to the frame at least at two connection locations which are located on the outer side, facing the intersection, of the corner element.

In order keep the number of connection locations which are required overall and consequently the assembly complexity during the production of the warehouse low, it is further proposed that the securing of each of the two guides which meet each other in the region of the intersection, on the one hand, and the corner element, on the other hand, be carried out at the same connection location and preferably with the same connection element, that is to say, the same screw connection.

Preferably, on the corner element, there is a projection which engages from the top into an opening or into a recess in one of the guides. In this manner, even without an additional screw connection, an independent positive-locking connection which has an advantageous effect on the fixing of the corner element and the stabilization thereof with respect to impacts is achieved. It is particularly advantageous when the end of the running rail of the guide is expanded to form a primarily circular plate whose circle center forms the center of the intersection, wherein the opening or recess mentioned is then located in the circular plate.

Other advantages and details are explained below with reference to the drawings.

BRIEF DESCRIPTION OF THE DRAWINGS

FIG. 6b shows a plan view of the objects according to FIG. 6a.

DETAILED DESCRIPTION

Figures 1, 2:
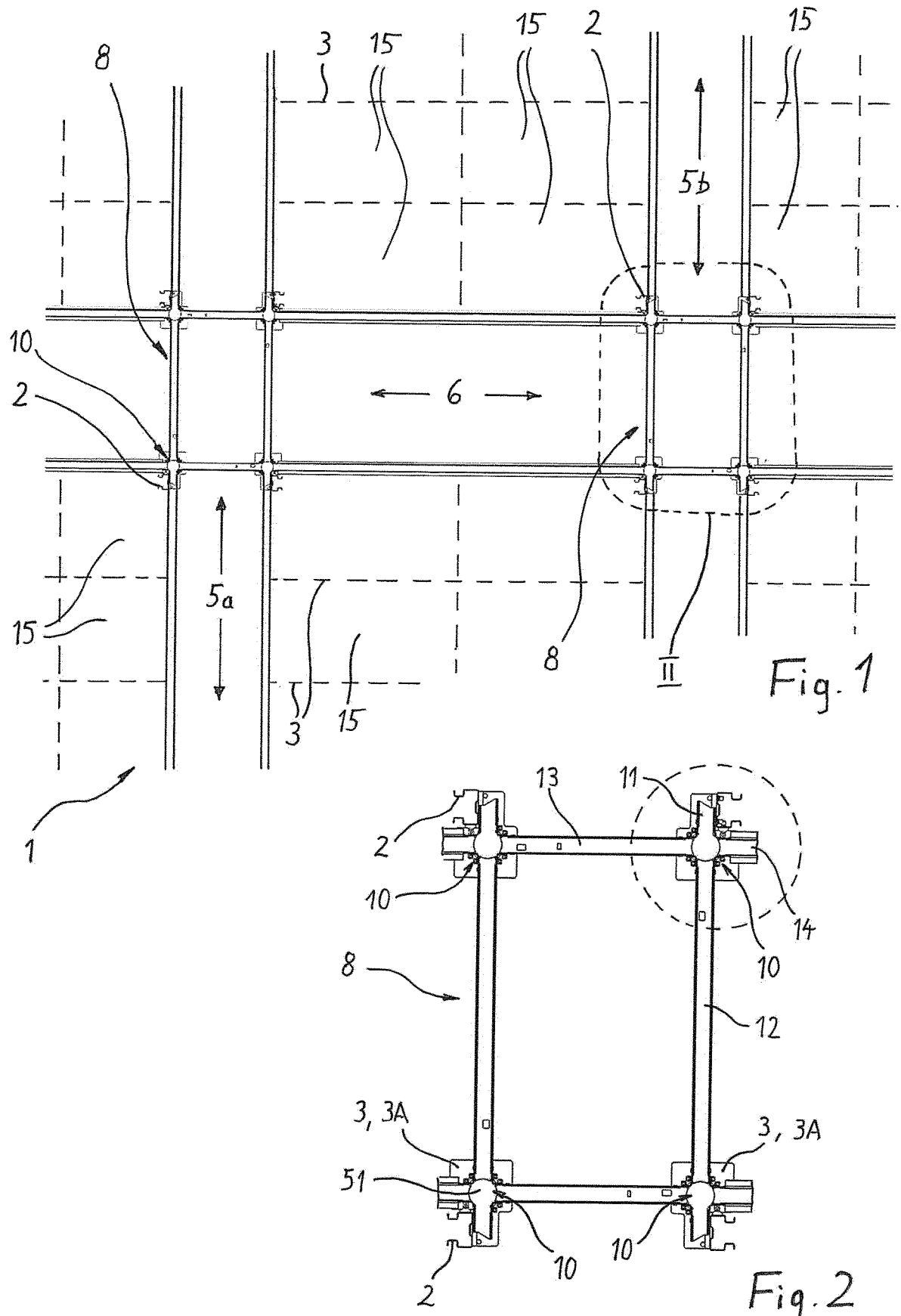
FIG. 1 shows a plan view of a portion of a warehouse for the storage and retrieval of goods or bundles of goods which are arranged on movable load carriers.
FIG. 2 shows the detail "II" of FIG. 1 to an enlarged scale.

The static basic frame of the warehouse which is partially depicted in FIG. 1 forms a frame 1 which is composed of a large number of vertical elements 2, in particular struts, horizontal elements 3 and where applicable reinforcing diagonal elements.

Within the expanded frame 1, a motor-driven distributor vehicle, also referred to as a "shuttle", can be moved into various positions in order to store and retrieve goods which are located on standardized pallets as load carriers from these positions. The distributor vehicle is constructed to move under the load carriers which are loaded with the goods, then to lift them and subsequently to transport them to another position within the warehouse. Such distributor vehicles operate autonomously and in a program-controlled manner. They run on at least four rollers in guides which are secured to a frame and which extend horizontally within the expanded frame 1. The rollers of the distributor vehicle are preferably all driven.

For movement within the warehouse, a plurality of channels or passages are provided therein, wherein FIG. 1 shows in a cut-out of the warehouse two transport passages 5*a*, 5*b* through which the distributor vehicle can travel. At both sides of the transport passages 5*a*, 5*b* there are located in the frame 1 individual storage locations 15 so that load carriers which are placed on these storage locations 15 can be removed from this respective position or stored at this position by the distributor vehicle. Storage locations 15 are located at both sides of the transport passages 5*a*, 5*b* and can therefore be used in each case by the distributor vehicle which is positioned in front of the relevant storage location 15 in the transport passage.

The transport passages 5*a*, 5*b* are arranged parallel with each other. In order to enable the distributor vehicle to change between the passages 5*a*, 5*b*, there is arranged in the frame 1 a transverse passage as a connection passage 6 through which the same distributor vehicle can also travel. This arrangement of the passages 5*a*, 5*b*, 6 produces intersection regions 8 in which the distributor vehicle can not only travel in a straight line but instead it can change and continue its travel in a traverse direction.

Since such distributor vehicles generally have wheels or rollers in the travel direction at the left and in the travel direction at the right and therefore require a total of two traffic lanes and this also applies to the other, that is, transversely arranged passage, in the intersection regions 8 of the transport passages 5*a*, 5*b* with the connection passage 6 there are a total of four intersections 10. The term intersection 10 is used here to refer to the location at which guides for the distributor vehicle meet at right-angles. In the region of each intersection 10, therefore, a total of four traffic lanes which are formed by guides extend toward each other in a cross-like manner.

FIG. 2 shows as an enlargement from FIG. 1 a complete intersection region 8 with the total of four intersections 10 at which four traffic lanes which are formed by guides 11, 12, 13, 14 for the wheels of the distributor vehicle extend toward each other in a cross-like manner.

In order to enable the distributor vehicle to continue travel in the transverse direction after it has arrived in the intersection region 8, depending on the structure of the distributor vehicle, either the wheels or rollers thereof can change their rolling direction, or the distributor vehicle is provided with two wheel sets of which four rollers or wheels are used for travel along the transport passages 5*a*, 5*b* and four other rollers or wheels are used for travel along the connection passage 6.

The running face and consequently the plane in which the wheels of the distributor vehicle travel is, however, always the same, that is to say, the running faces on all the guides 11, 12, 13, 14 which meet at the intersection 10 are located at the same level without stepped transitions between them.

However, track joints, that is to say, relatively small joints between the running face of a guide and the running faces of the other guides cannot be prevented. Structurally, track joints or joints can be minimized, for example, by a correspondingly precise processing of the ends of the guides 11-14. It is also important that the mutually facing ends of all the guides 11-14 are supported on a common horizontal support face 17. The support face 17 which is common to the guides forms in this instance the flat upper side of a horizontal plate 3A. This plate is a component of the frame 1 or is rigidly secured to components of the frame.

Figure 3:
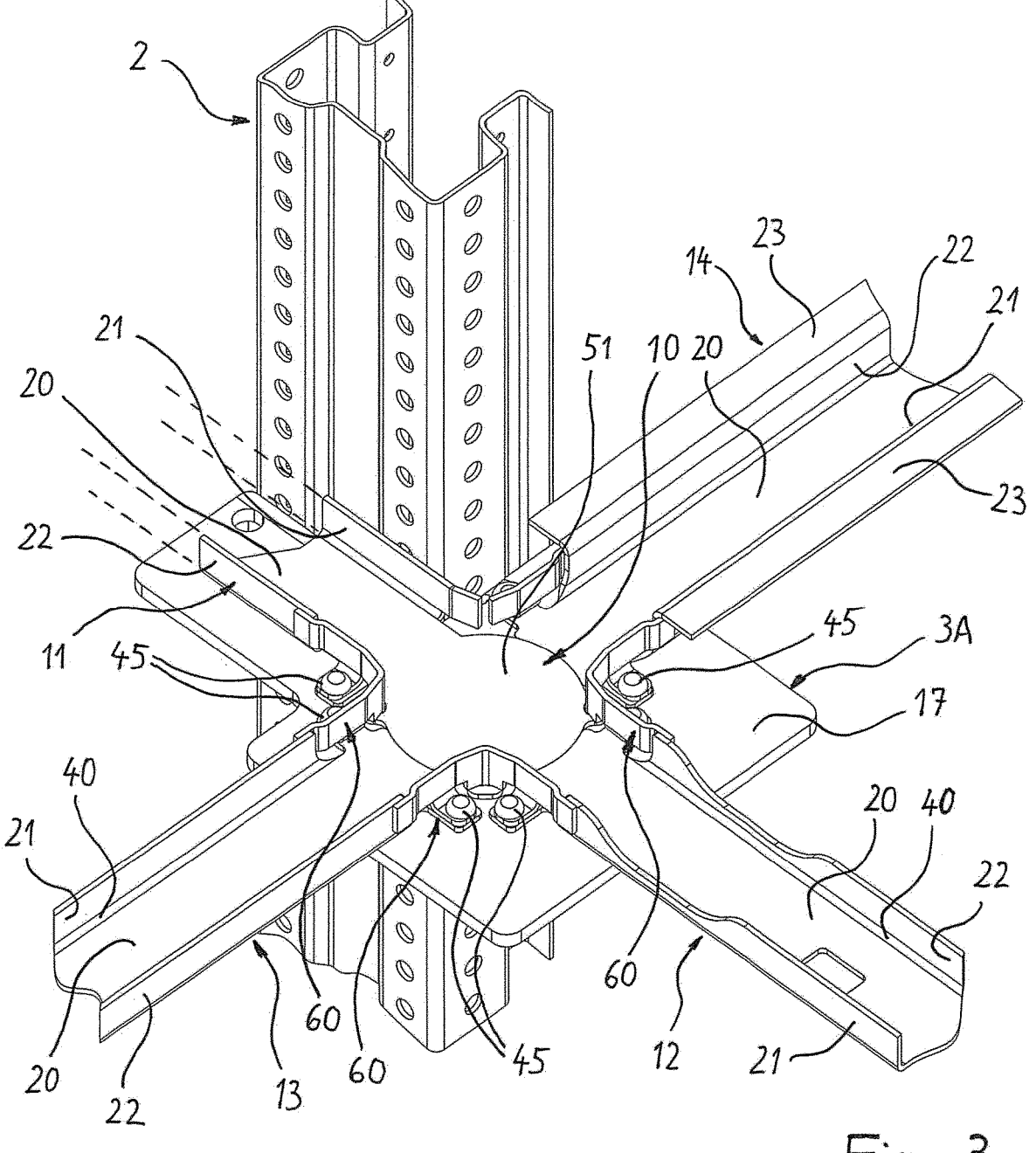
FIG. 3 shows a perspective illustration of the region marked at the top right in FIG. 2.

FIG. 3 shows the region of one of the four intersections 10 as a perspective view, including the horizontal plate 3A which forms the common support face 17 and the four guides 11, 12, 13, 14 which are supported on the plate 3A and which are used for the travel and the lateral guiding of the respective wheels of the distributor vehicle. In this instance, the guides 11 and 12 which are arranged sequentially in the longitudinal direction thereof are components of the passage 5*b*. The guides 13 and 14 arranged sequentially in the longitudinal direction thereof are components of the transverse passage 6.

Each guide 11, 12, 13, 14 is composed integrally of a running rail 20 on which the wheels of the distributor vehicle travel and upright side walls 21, 22 at both sides along the running rail 20. The side walls 21, 22 can, as is the case in FIG. 3 in order to reinforce the guide 14, be provided with externally adjacent horizontal edge portions 23, whereby this guide 14 has the cross section of an upturned hat-like profile and can withstand bending loads particularly well. The side walls 21, 22 are preferably located perpendicularly to the running rail 20 in order to thus laterally guide the rollers or wheels of the distributor vehicle which are not steered.

The side walls 21, 22 do not extend over the entire length of the guides 11, 12, 13, 14. Instead, the side walls 21, 22 are omitted on the end portions of the guides 11, 12, 13, 14, that is to say, at those portions which face the next guide in the longitudinal direction or which face the intersection 10. Instead, the guides 11-14 are provided on these end portions with either a laterally protruding flap 31, that is to say, in the case of the guide 11, or two laterally protruding flaps 31, 32 in the case of the guides 12, 13 and 14.

The flaps 31, 32 are formed integrally, wherein they protrude horizontally laterally from the respective running rail 20 and are in each case provided with a vertical opening 33 or alternatively a recess through which a screw with a vertical screw axis is guided. The flaps 31, 32 are constructed to be flat, that is to say, they are positioned with the flat lower side thereof on the horizontal support face 17 of the plate 3A. The flat upper side of the flaps 31, 32 is flush with the running face of the running rail 20.

Figure 7:
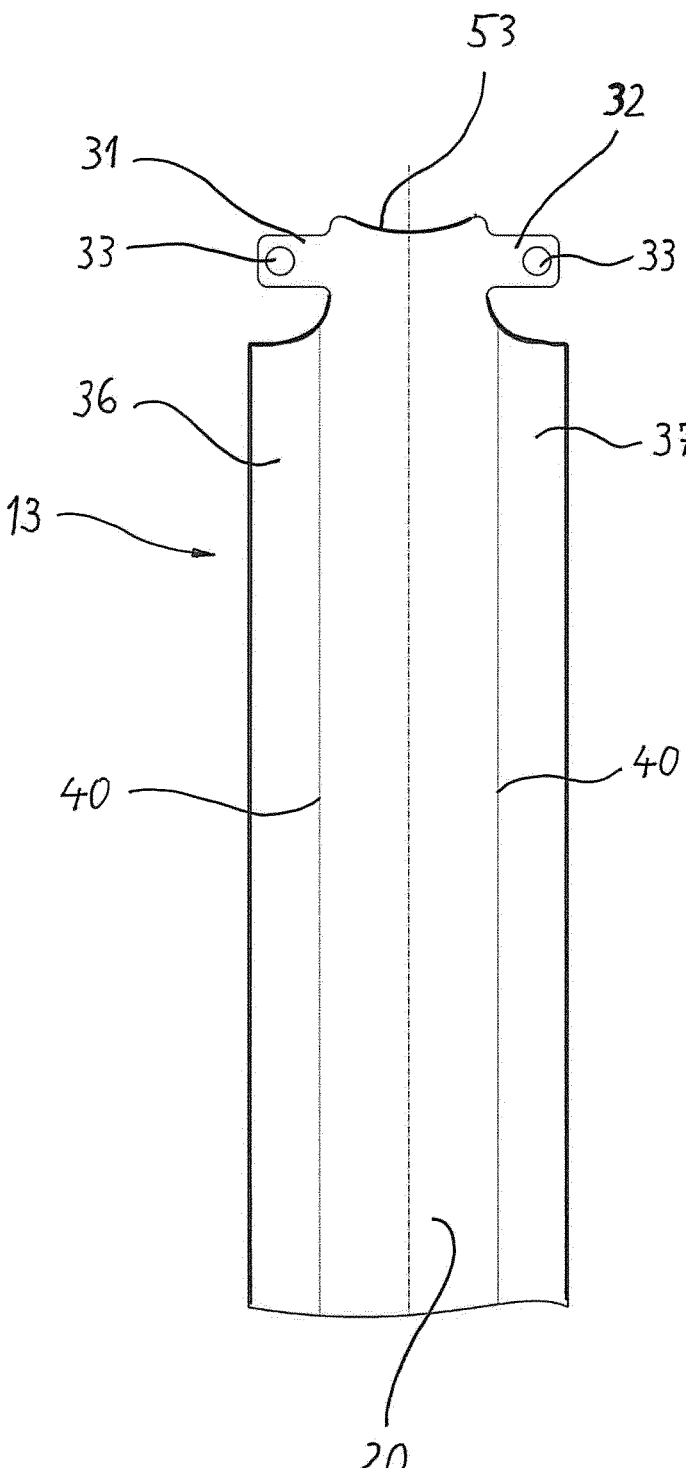
FIG. 7 shows a guide in an embodiment as an intermediate product.

FIG. 7 shows one of the four guides in an intermediate technical production stage in which the side walls 21, 22 have not yet been bent upward by means of a bending process. The guide 13 is at this stage still a flat steel plate which has been preformed by means of punching. The surface thereof is composed of a central region, which later forms the running rail, and edge regions 36, 37 which laterally adjoin the central region. Over the majority of the overall length of the guide 13, the edge regions 36, 37 adjoin the central region by means of bending lines 40, whilst on an end portion of the guide 13 the edge regions at that location are flaps 31, 32 which are provided with the openings 33. A first longitudinal portion of the edge regions 36, 37 thus forms, as a result of a bending process which is simple to carry out, the respective side wall 21, 22 whilst a shorter second longitudinal portion of the edge regions is not subjected to any subsequent deformation and instead forms the respective flap 31, 32. The side walls 21, 22 are therefore omitted on the part-length of the guide 13 on which the flaps 31, 32 are formed. Conversely, the flaps 31, 32 which protrude horizontally from the running face are omitted on the part-length of the guide 13 on which the side walls 21, 22 are formed.

This embodiment complies with the precondition for producing the guide 13 in a cost-effective manner from an initially flat piece of sheet steel which has been prefabricated by means of punching. A first edge portion of this steel sheet forms, as a result of a bending process which is simple to carry out, the respective side wall 21, 22 whilst a comparatively shorter second edge portion is not subjected to any deformation and forms the flaps 31, 32 which are arranged at the left and right side for guiding through the screw connection.

The embodiment described here in relation to the guide 13 also applies to the guides 12 and 14, whereas the guide 11 is provided only at one side with a flap 31 and a flap at the other side is omitted. The reason for this, as can be seen in FIG. 3, is the narrow spatial situation at the side of the guide 11 since this guide is located very close to a vertical strut 2.

Figures 4, 5:
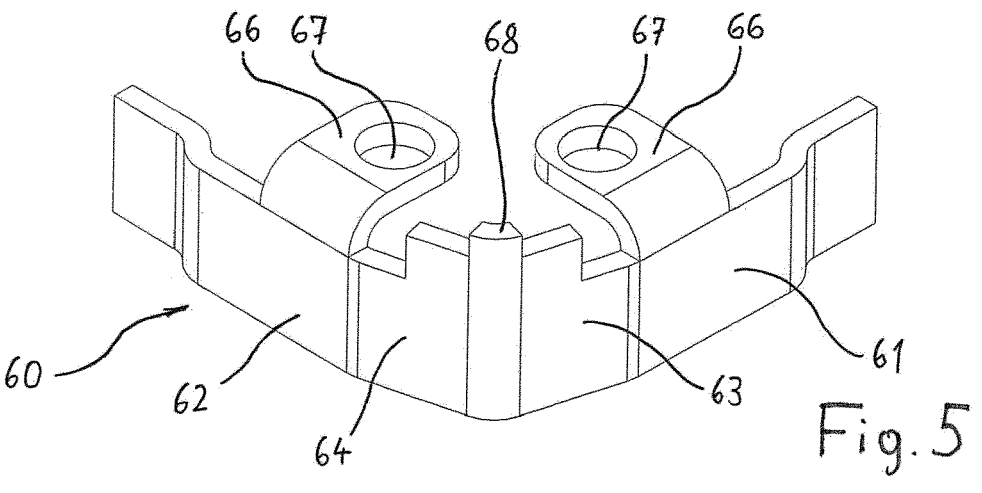
FIG. 4 shows the individual components of FIG. 3, in this instance as an exploded view.
FIG. 5 shows a perspective illustration of a corner element.

According to FIG. 4, a connection element 45 having a vertical axis is guided in each case through the flap 31 or the two flaps 31, 32. The connection element 45 is in this instance a screw connection which is guided through the opening 33 in the respective flap 31, 32 and through a hole which is in alignment with this opening 33 in the plate 3A which is secured to the frame.

Figure 6A:
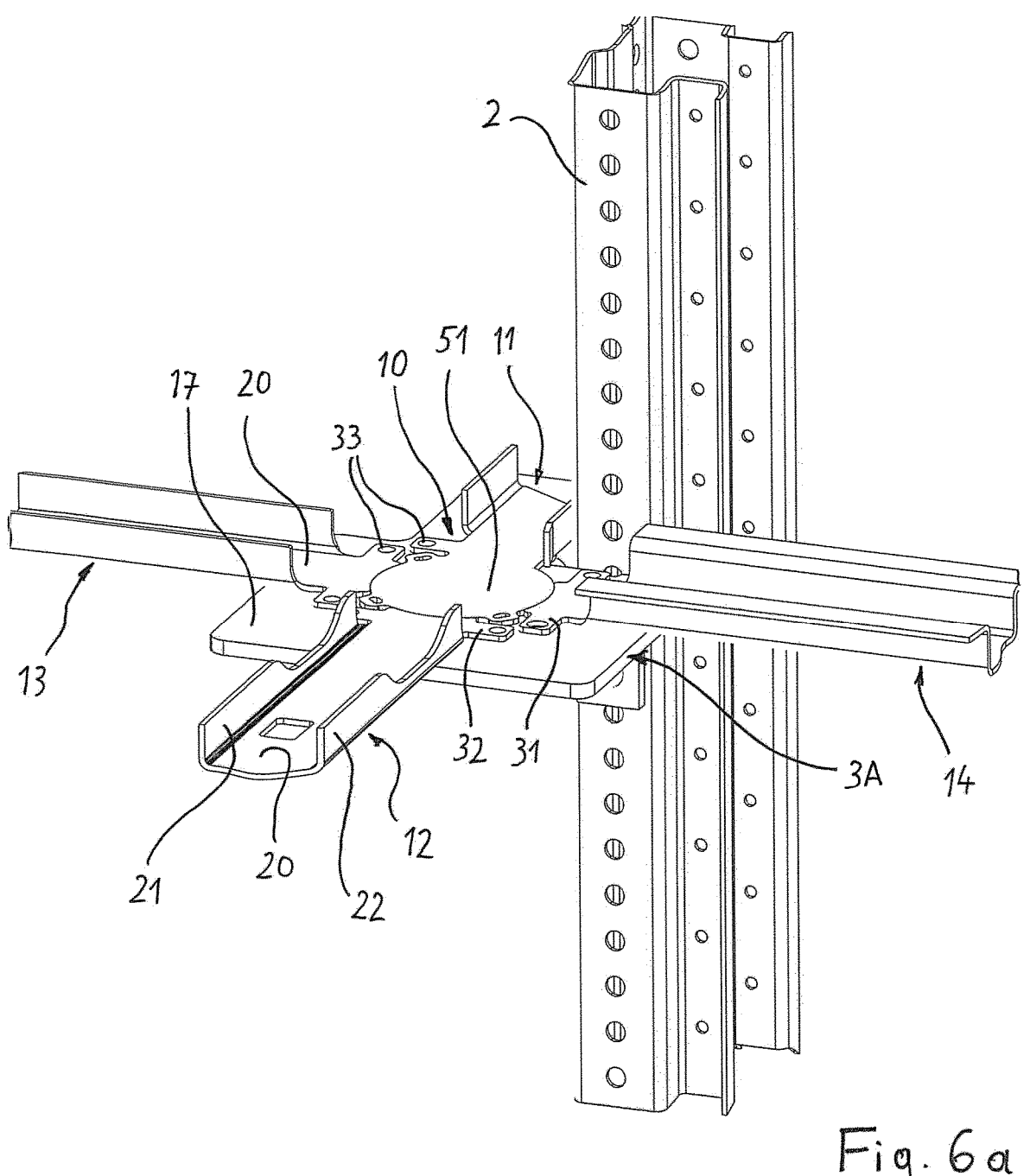
FIG. 6a shows the region of the intersection in another perspective view, wherein the corner elements are omitted in this instance for reasons of clarity.
Figure 6B:
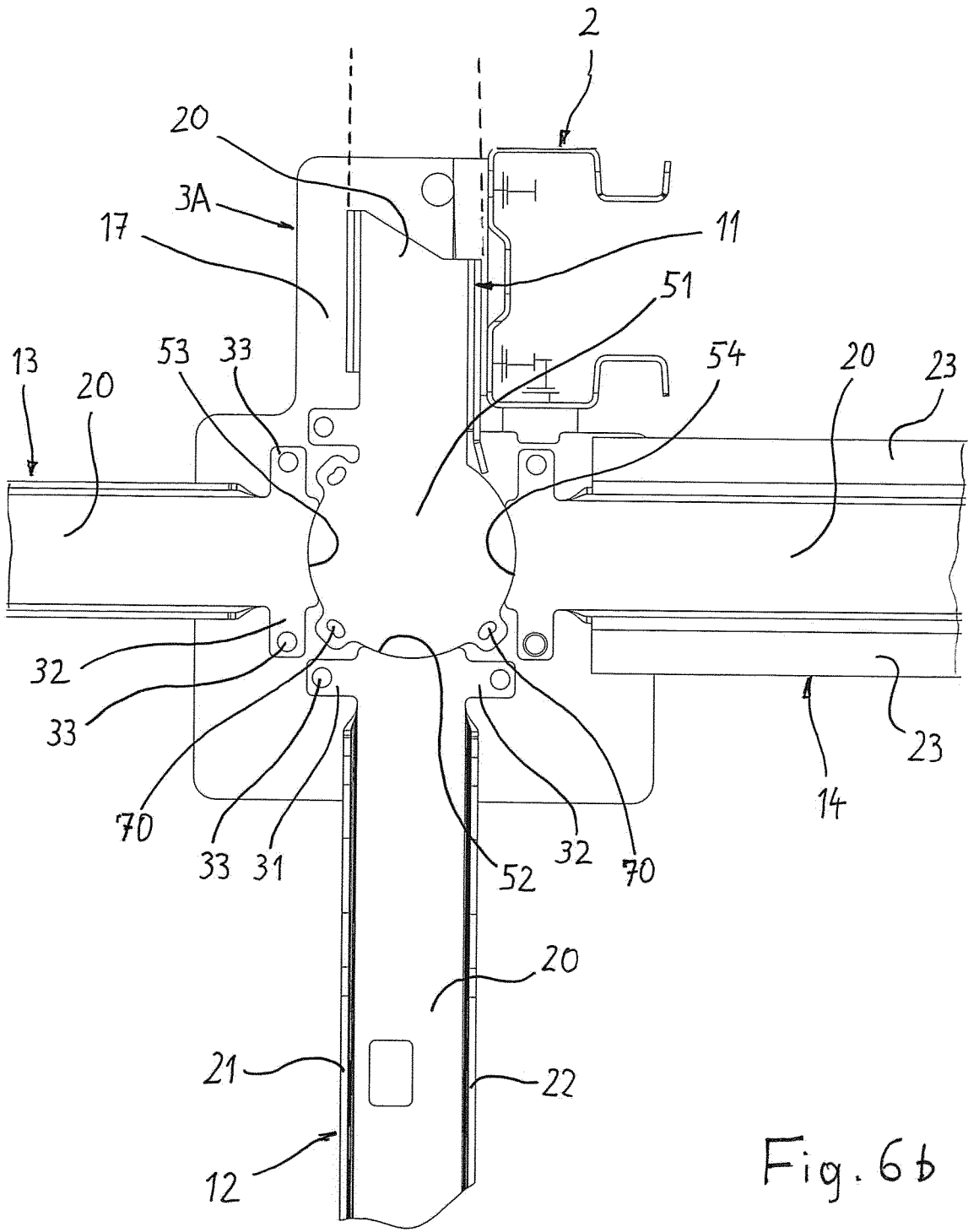

In a state facing the intersection 10, the ends of the four guides 11-14 are configured partially differently, as can be seen particularly in FIG. 6b. Exclusively in the case of the guide 11, the end of the running rail 20 is expanded to form a circular plate 51 whose circle center is located in the center of the intersection 10. The plate 51 has on the circumference thereof three part-circular edge portions, opposite which edges 52, 53, 54 which are configured in a circular-concave manner are located at the ends of the running rails of the remaining three guides 12, 13, 14.

The center of the intersection 10 is thus filled by the plate 51 which is formed integrally on the guide 11 and the ends of the other guides 12, 13, 14 adjoin this circular shape with the concave edges 52, 53, 54 thereof. Any remaining gaps should be as small as possible since the rollers of the distributor vehicle moving over them can generate noise.

Preferably, the plate 3A is screwed by means of a corresponding console directly onto the adjacent stable strut 2. The plate 3A is of such an extent and extends below the guides 11-14 to such an extent that the guides are not only positioned on the support face 17 with the longitudinal portion on which the flaps 31, 32 are present, but also with a portion of the longitudinal portion on which the side walls 21, 22 are present. As a result of this sizing of the plate 3A or the support face 17 with respect to the guides 11-14, it is ensured that there is no bending of the guides 11-14 on the longitudinal portion on which the side wall 21, 22 terminates and the laterally protruding flap 31, 32 begins.

It can be seen in FIG. 3, in particular in connection with FIG. 4 which is depicted as an exploded view, that in the corner region of the two guides 11 and 13, in the corner region of the two guides 13 and 12 and in the corner region of the two guides 12 and 14, an independent additional corner element 60 is arranged. In contrast, such a corner element 60 is missing in the corner region between the guides 11 and 14 since in this corner region, as a result of the vertical strut 2, there is not sufficient space for such a corner element.

The objective of the corner elements 60 involves improving in the region of the intersection 10 the transition between the side walls 21, 22 which are arranged at right-angles with respect to each other and to avoid disruptive edges at this location.

To this end, the corner element 60 which is illustrated in FIG. 5 as an individual component has a plurality of different wall portions. Two wall portions 61, 62 are arranged substantially at right-angles with respect to each other. Between these wall portions 61, 62 there are two additional wall portions 63, 64 whose wall faces facing the intersection 10 are arranged at an angle between 210° and 260° with respect to each other, whereby these wall portions 63, 64 act as inclined introduction members for the rollers of the distributor vehicle.

Each corner element 60 is configured in such a manner that the wall portions 61, 62 are in alignment with the adjacent side walls 21, 22 of the respective guide at this location. The wall faces facing the running face, on the one hand, and, on the other hand, the respective wall portions 61, 62 merge almost steplessly into each other.

Each corner element 60 has two flaps 66 which are each provided with an opening 67 or alternatively a recess. The flaps 66 are located at the outer side of the corner element 60 facing away from the intersection 10.

In FIGS. 3 and 4, the assembly position of the corner element 60 can be seen. The openings 67 in the two flaps 66 of the corner element 60 are positioned in such a manner that they are in alignment with the openings 33 which are arranged below in the flaps 31, 32. The securing of each of the two guides which meet each other in the region of the intersection, on the one hand, and the corner element 60, on the other hand, is thus carried out at the same connection location and with the same vertically extending connection element 45.

The corner element 60 is provided between the two flaps 66 thereof with a formed-on projection 68. This projection engages, when the corner element is screwed, into an opening 70 in the plate 51 in a positive-locking manner. In this manner, an additional location positioning of the corner element 60 is achieved without additional screwing being required for this.

It is important in the region of all the corners of the intersection 10 that all the connection elements 45 which are in the form of screw connections are arranged both laterally outside the respective running rail 20 and also laterally outside the plane in which the respective side wall 21, 22 extends. When the distributor vehicle travels over, impacts and vibrations caused by the screw connections are thus prevented. Precisely at the intersection 10, this is significant since it is travelled over particularly frequently by the distributor vehicle during operational procedure.

The connection elements 45 are screw connections comprising a screw head and a counter nut which is placed against the plate 3A from below. Alternatively, press-in threaded bolts can be used as connection elements, as described in greater detail in EP 3 321 216 A1.

LIST OF REFERENCE NUMERALS

1 Frame
2 Vertical element, strut
3 Horizontal element
3A Horizontal plate
5a Passage, transport passage
5b Passage, transport passage
6 Passage, connection passage
8 Intersection region
10 Intersection
11 Guide
12 Guide
13 Guide

9

14 Guide
15 Storage space
17 Horizontal support face
20 Running rail
21 Side wall
22 Side wall
23 Edge portion
31 Flap
32 Flap
33 Opening
36 Edge region
37 Edge region
40 Bending line
45 Connection element
51 Plate
52 Edge
53 Edge
54 Edge
60 Corner element
61 Wall portion
62 Wall portion
63 Wall portion
64 Wall portion
66 Flap
67 Opening
68 Projection
70 Opening

The invention claimed is:

1. A warehouse for the storage and retrieval, by a distributor vehicle, of goods or bundles of goods which are arranged on load carriers, comprising:
passages (5a, 5b, 6) which are arranged in a frame (1) and through which the distributor vehicle can travel; and
storage spaces (15) which are arranged in the frame (1) for the load carriers,
wherein components of the passages (5a, 5b, 6) are guides (11, 12, 13, 14) which are secured to the frame (1) and which each have a running rail (20) on which the distributor vehicle can travel and upright side walls (21, 22) at both sides along the running rail (20),
wherein the guides (11, 12, 13, 14) are secured at mutually facing ends thereof in each case by at least one vertically extending connection element (45) to a horizontal support face (17) which is secured to the frame, and
wherein the connection element (45) is arranged laterally outside the running rail (20) and laterally outside a plane in which the respective side wall (21, 22) extends.

2. The warehouse as claimed in claim 1,
wherein flaps (31, 32) which protrude laterally from the running rail (20) are formed on the guides (11, 12, 13, 14) and
wherein the respective connection element (45) extends vertically through an opening (33) or recess in the flaps (31, 32).

3. The warehouse as claimed in claim 2,
wherein the flaps (31, 32) are positioned with a flat lower side thereof on the horizontal support face (17).

4. The warehouse as claimed in claim 3,
wherein a flat upper side of the flaps (31, 32) is flush with a running face of the running rail (20).

5. The warehouse as claimed in claim 3,
wherein the side walls (21, 22) are omitted on a longitudinal portion of the guides (11, 12, 13, 14) on which the flaps (31, 32) are formed.

6. The warehouse as claimed in claim 2,
wherein the guides (11, 12, 13, 14) are positioned on such a length on the horizontal support face (17) that both a longitudinal portion which is provided with the flaps (31, 32) and a portion of the longitudinal portion, which has the side walls (21, 22), of the guide is supported on the support face (17).

7. The warehouse as claimed in claim 1,
wherein the horizontal support face (17) is an upper side of a plate (3A) which is secured to the frame (1).

8. A warehouse for the storage and retrieval, by a distributor vehicle, of goods or bundles of goods which are arranged on load carriers, comprising:
transport passages (5a, 5b) which are arranged in a frame (1) and through which the distributor vehicle can travel; and
storage spaces (15) which are arranged at a side of the transport passages (5a, 5b) in the frame (1) for the load carriers and having a connection passage (6) through which the distributor vehicle can also travel and which intersects the transport passages (5a, 5b) at intersections (10),
wherein components of the connection passage (6) and the transport passages (5a, 5b) are guides (11, 12, 13, 14) which are secured to the frame (1) and which each have a running rail (20) along which the distributor vehicle can travel and upright side walls (21, 22) at both sides along the running rail (20),
wherein the guides (11, 12, 13, 14) extend crosswise toward each other in a region of the intersection (10),
wherein at least one of the guides (11, 12, 13, 14) is secured at an end thereof facing the intersection (10) by means of at least one vertically extending connection element (45) to a horizontal support face (17) which is secured to the frame, and
wherein the connection element (45) is arranged laterally outside the running rail (20) and laterally outside a plane in which the respective side wall (21, 22) extends.

9. The warehouse as claimed in claim 8,
wherein flaps (31, 32) which protrude laterally from the running rail (20) are formed on the guides (11, 12, 13, 14) and
wherein the respective connection element (45) extends vertically through an opening (33) or recess in the flaps (31, 32).

10. The warehouse as claimed in claim 9,
wherein the flaps (31, 32) are positioned with a flat lower side thereof on the horizontal support face (17).

11. The warehouse as claimed in claim 10,
wherein a flat upper side of the flaps (31, 32) is flush with the running face of the running rail (20).

12. The warehouse as claimed in claim 10,
wherein the side walls (21, 22) are omitted on a longitudinal portion of the guides (11, 12, 13, 14) on which the flaps (31, 32) are formed.

13. The warehouse as claimed in claim 9,
wherein the guides (11, 12, 13, 14) are positioned on such a length on the horizontal support face (17) that both a longitudinal portion which is provided with the flaps (31, 32) and a portion of the longitudinal portion, which has the side walls (21, 22), of the guides are supported on the support face (17).

14. The warehouse as claimed in claim 8,
wherein exclusively with one (11) of the guides an end of the running rail (20) is expanded to form a primarily circular plate (51) whose circle center is located in the center of the intersection (10).

15. The warehouse as claimed in claim 14, wherein the plate (51) has on a circumference thereof three part-circular edge portions, opposite which edges (52, 53, 54) which are configured in a circular-concave manner in each case are located at the ends of the running rails (20) of the remaining guides.

16. The warehouse as claimed in claim 8, wherein in a corner region of two of the guides which meet in the region of the intersection (10) there is arranged a corner element (60) having two wall portions (61, 62) which are arranged at an angle relative to each other and of which a first wall portion (61) adjoins the side wall (21) of one of the two guides and a second wall portion (62) adjoins the side wall (22) of the other of the two guides.

17. The warehouse as claimed in claim 16, wherein the two wall portions (61, 62) are arranged at right-angles with respect to each other, and in that the corner element (60) has between the two wall portions (61, 62) at least two additional wall portions (63, 64) whose wall faces facing the intersection (10) are arranged at an angle between 210° and 260° with respect to each other.

18. The warehouse as claimed in claim 16, wherein the corner element (60) has at least at two connection locations which are located at an outer side, facing away from the intersection (10), of the corner element (60) and are secured on the horizontal support face (17).

19. The warehouse as claimed in claim 16, wherein the securing of each of the two guides (11, 12, 13, 14) which meet in the region of the intersection (10) and the corner element (60) is carried out at the same connection location with the same connection element (45).

20. The warehouse as claimed in claim 16, wherein a projection (68) which is formed on the corner element (60) engages from above into an opening (70) or recess in one (11) of the guides.

21. The warehouse as claimed in claim 20, wherein the end of the running rail of the one guide (11) is expanded to form a primarily circular plate (51) whose circle center is located in the center of the intersection (10) and in that the opening (70) or recess is located in the plate (51).

22. The warehouse as claimed in claim 8, wherein the horizontal support face (17) is an upper side of a plate (3A) which is secured to the frame (1).

* * * * *